US009082237B2

(12) United States Patent
Breed

(10) Patent No.: US 9,082,237 B2
(45) Date of Patent: Jul. 14, 2015

(54) VEHICLE ACCESS AND SECURITY BASED ON BIOMETRICS

(71) Applicant: Intelligent Technologies International, Inc., Boonton, NJ (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days.

(21) Appl. No.: 14/163,100

(22) Filed: Jan. 24, 2014

(65) Prior Publication Data

US 2014/0152422 A1    Jun. 5, 2014

Related U.S. Application Data

(63) Continuation-in-part of application No. 11/619,863, filed on Jan. 4, 2007, now Pat. No. 8,948,442, which is a continuation-in-part of application No. 10/931,288, filed on Aug. 31, 2004, now Pat. No. 7,164,117, which (Continued)

(51) Int. Cl.
*G07C 9/00* (2006.01)
*G06K 9/00* (2006.01)
*B60R 25/08* (2006.01)
*B60R 25/25* (2013.01)

(52) U.S. Cl.
CPC ............ *G07C 9/00134* (2013.01); *B60R 25/08* (2013.01); *B60R 25/25* (2013.01); *G06K 9/00369* (2013.01)

(58) Field of Classification Search
CPC ........... G06K 9/00369; G07C 9/00134; B60R 21/01526; B60R 21/0152; B60R 21/01538

USPC .......... 340/5.52, 5.72, 5.82, 5.83, 5.61, 5.64, 340/426.13, 426.16, 426.17, 426.36; 307/0.4, 10.5

See application file for complete search history.

(56) References Cited

U.S. PATENT DOCUMENTS

| | | | |
|---|---|---|---|
| 5,307,048 A | 4/1994 | Sonders | |
| 5,440,177 A | 8/1995 | Bellin et al. | |
| 5,686,765 A | 11/1997 | Washington | |
| 5,917,433 A * | 6/1999 | Keillor et al. | 340/989 |
| 6,140,939 A * | 10/2000 | Flick | 340/12.28 |

(Continued)

FOREIGN PATENT DOCUMENTS

WO    2012125726 A1    9/2012

OTHER PUBLICATIONS

Abstract of JP 2010-191680, published Sep. 2, 2010.

*Primary Examiner* — Edwin Holloway, III
(74) *Attorney, Agent, or Firm* — Brian Roffe

(57) ABSTRACT

Method for interacting with a vehicle includes controlling interaction with the vehicle based on receipt of a signal by a component on the vehicle, and generating the signal based on biometric data entered via a portable communications device proximate the vehicle. The entered biometric data may be verified as biometric data of a driver of the vehicle prior to generating the signal. The biometric data may be a fingerprint, a palm print, a hand print, a facial image, and/or a voiceprint, all of which may be obtained using the communications device, e.g., a smartphone. The controlled interaction with the vehicle may be maintaining a brake lockout mechanism coupled to at least one brake of the vehicle in a locked state until the signal is received and/or maintaining at least one door of the vehicle in a locked state until the signal is received.

29 Claims, 6 Drawing Sheets

Related U.S. Application Data is a continuation-in-part of application No. 10/457,238, filed on Jun. 9, 2003, now Pat. No. 6,919,803, application No. 11/619,863, which is a continuation-in-part of application No. 10/940,881, filed on Sep. 13, 2004, now Pat. No. 7,663,502, which is a continuation-in-part of application No. 10/457,238, application No. 14/163,100, which is a continuation-in-part of application No. 11/874,343, filed on Oct. 18, 2007, which is a continuation-in-part of application No. 10/940,881, application No. 14/163,100, which is a continuation-in-part of application No. 13/602,510, filed on Sep. 4, 2012, now Pat. No. 9,030,321, which is a continuation-in-part of application No. PCT/US2012/029079, filed on Mar. 14, 2012, application No. 14/163,100, which is a continuation-in-part of application No. 14/024,204, filed on Sep. 11, 2013, now Pat. No. 9,033,116, which is a continuation of application No. PCT/US2012/029079, filed on Mar. 14, 2012.

(60) Provisional application No. 60/387,792, filed on Jun. 11, 2002, provisional application No. 61/452,418, filed on Mar. 14, 2011, provisional application No. 61/508,822, filed on Jul. 18, 2011, provisional application No. 61/584,642, filed on Jan. 9, 2012.

(56) References Cited

U.S. PATENT DOCUMENTS

| | | | |
|---|---|---|---|
| 6,219,439 B1 | 4/2001 | Burger | |
| 6,581,712 B1 | 6/2003 | Nathans | |
| 6,919,803 B2 | 7/2005 | Breed | |
| 6,923,509 B1 | 8/2005 | Barnett | |
| 6,931,538 B1 | 8/2005 | Sawaguchi | |
| 7,164,117 B2 | 1/2007 | Breed et al. | |
| 7,183,895 B2 | 2/2007 | Bazakos et al. | |
| 7,249,025 B2 | 7/2007 | Junqua et al. | |
| 7,272,469 B2 | 9/2007 | Kalan et al. | |
| RE40,073 E | 2/2008 | Breed | |
| 7,663,502 B2 | 2/2010 | Breed | |
| 7,937,075 B2 | 5/2011 | Zellner | |
| 8,005,267 B2 | 8/2011 | Chew | |
| 2002/0098835 A1* | 7/2002 | Flick | 455/420 |
| 2002/0145535 A1* | 10/2002 | Flick | 340/825.69 |
| 2002/0173344 A1* | 11/2002 | Cupps et al. | 455/566 |
| 2003/0006886 A1* | 1/2003 | Gabbard | 340/425.5 |
| 2005/0195106 A1* | 9/2005 | Davis et al. | 342/357.08 |
| 2006/0001523 A1* | 1/2006 | Underdahl et al. | 340/5.64 |
| 2007/0262574 A1 | 11/2007 | Breed et al. | |
| 2008/0036580 A1 | 2/2008 | Breed | |
| 2013/0232073 A1 | 9/2013 | Sheets et al. | |
| 2013/0290136 A1 | 10/2013 | Sheets et al. | |

* cited by examiner

FIG. 6
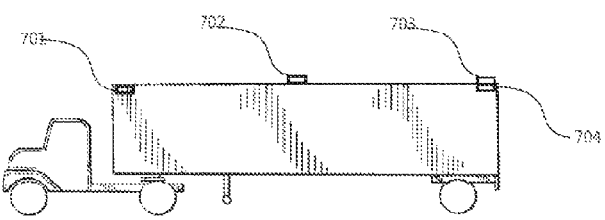
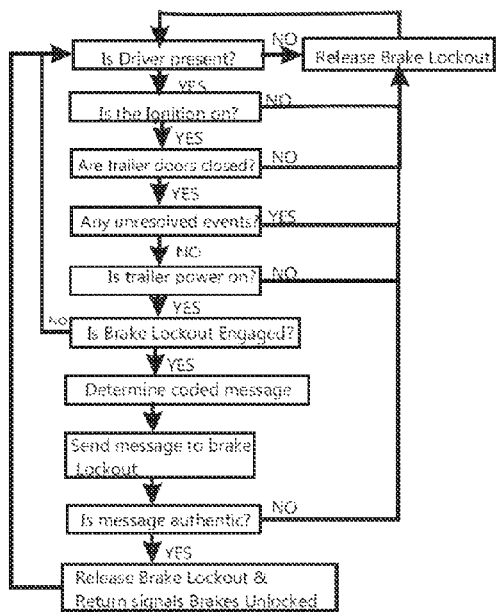
FIG. 7
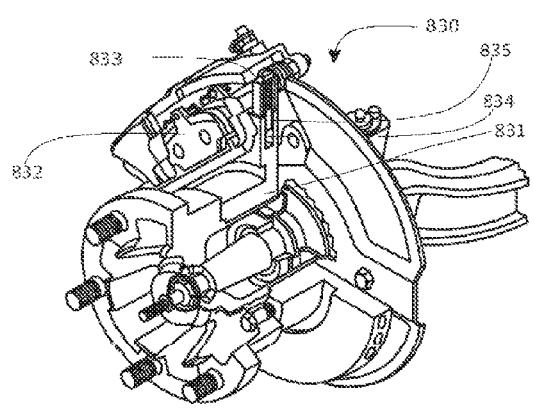
FIG. 10A
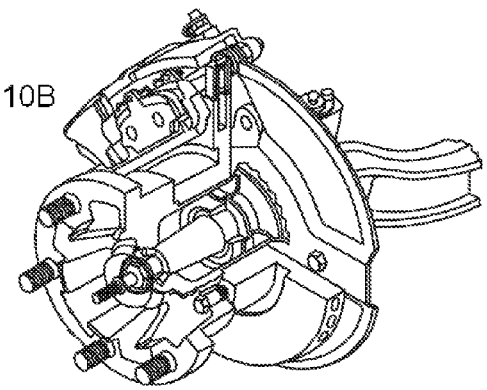
FIG. 10B

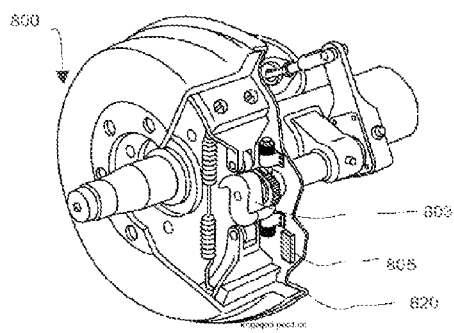
FIG. 8
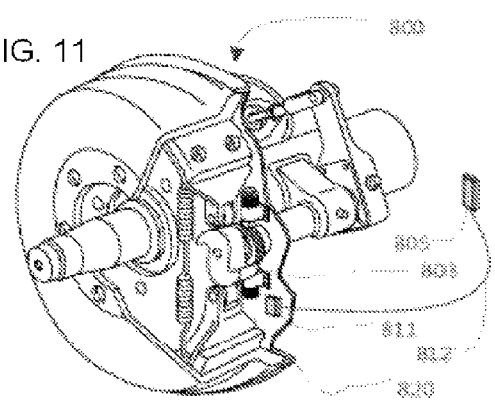
FIG. 11
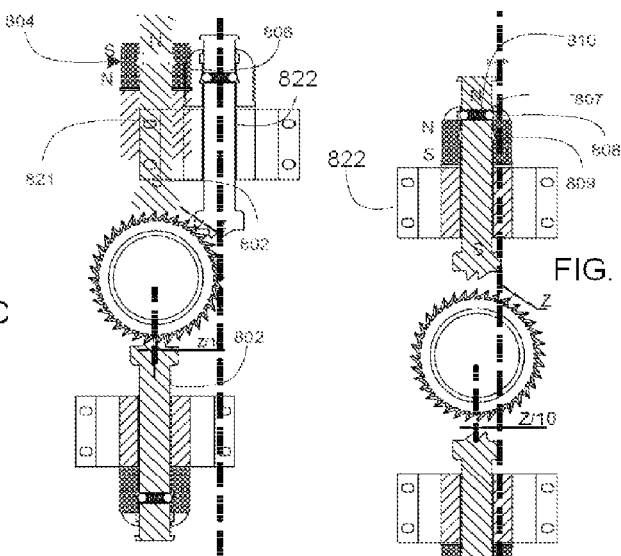
FIG. 9C
FIG. 9D
FIG. 9E
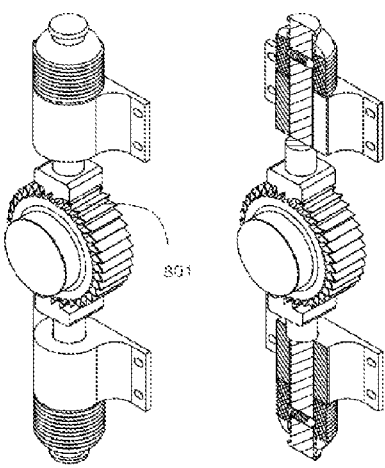
FIG. 9A
FIG. 9B
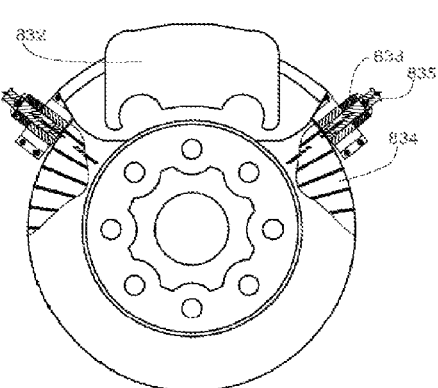
FIG. 10C

VEHICLE ACCESS AND SECURITY BASED ON BIOMETRICS

CROSS-REFERENCE TO RELATED APPLICATIONS

This application is:
1. a continuation-in-part (CIP) of U.S. patent application Ser. No. 11/619,863 filed Jan. 4, 2007, which is:
  A. a CIP of U.S. patent application Ser. No. 10/931,288 filed Aug. 31, 2004, now U.S. Pat. No. 7,164,117, which is a CIP of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002; and
  B. a CIP of U.S. patent application Ser. No. 10/940,881 filed Sep. 13, 2004, now U.S. Pat. No. 7,663,502, which is a CIP of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002; and
2. a CIP of U.S. patent application Ser. No. 11/874,343 filed Oct. 18, 2007, which is a CIP of U.S. patent application Ser. No. 10/940,881 filed Sep. 13, 2004, now U.S. Pat. No. 7,663,502, which is a CIP of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002; and
3. a CIP of U.S. patent application Ser. No. 13/602,510 filed Sep. 4, 2012 which is a continuation-in-part of International Application No. PCT/US12/29079, with an International filing date of Mar. 14, 2012, which claims priority of U.S. provisional patent application Ser. Nos. 61/452,418 filed Mar. 14, 2011, 61/508,822 filed Jul. 18, 2011, and 61/584,642 filed Jan. 9, 2012; and
4. a CIP of U.S. patent application Ser. No. 14/024,204 filed Sep. 11, 2013 which is a continuation of International Application No. PCT/US12/29079, with an International filing date of Mar. 14, 2012, which claims priority of U.S. provisional patent application Ser. Nos. 61/452,418 filed Mar. 14, 2011, 61/508,822 filed Jul. 18, 2011, and 61/584,642 filed Jan. 9, 2012, all of which are incorporated by reference herein.

FIELD OF THE INVENTION

The present invention relates generally to arrangements and methods for interacting with a vehicle based on biometric identification and more particularly to arrangements and methods for controlling access to a vehicle based on biometric identification and preventing theft of cargo from a vehicle transporting the cargo based on biometric identification.

BACKGROUND OF THE INVENTION

The theft of cargo in the United States has been reported by the FBI as being approximately $30 Billion annually in terms of the actual cargo value and may be as much as ten times that amount if all costs are take into account such as disruptions in the supply chain. C. H. Robinson has been working with the Flemming Cargo Securement and OnAsset companies to reduce this theft through placing hidden sensors and transmitters within pallets of cargo. This solution is destined to fail as thieves become aware of this approach and move to defeat it. Thieves have learned how to defeat other attempted theft countermeasures such as locks and transmitting systems and thus there is a need for a new comprehensive solution to reduce the theft of cargo eventually to zero. The inventions described herein are to solve this heretofore unsolved serious cargo theft problem and achieve zero cargo theft. The implementation of these inventions can be termed The Road to Zero Cargo Theft™ or RtZCT™.

Additional statistics appeared in a recent report (February 2008) published by the International Road Union (IRU) and International Transport Forum (ITF) highlighted that over the period 2000-2005:
1. 17% of all drivers have suffered an attack during the 5-year period investigated
2. 30% of attacked drivers have been attacked more than once
3. 21% of drivers were physically assaulted
4. 60% of the attacks targeted the vehicle and its load
5. 42% of the attacks took place in truck parking areas
6. 30% of the attacked drivers did not report the incident to the police
7. Countries where the highest number of surveyed attacks occurred, per million tonnes of international traffic, are: Romania (5.03/Mt), Hungary (1.31/Mt), and Poland (1.21/Mt)

According to an EU Parliament report, the Transported Asset Protection Association (TAPA) estimated losses of 8.2 billion Euros across the whole of Europe, which when viewed in full economic loss terms, including cost of replacement goods, re-shipping and reputational damage etc. are a small fraction of the actual damage.

In the US, Cargo theft rose by 4.1% in 2010, to 899 recorded theft incidents, the highest on record. Of the 899 incidents, 724 (81%) were full truckload or container thefts and 31 were warehouse burglaries (3.4%). Violence was involved in 1.3% of the incidents (10 hijackings and two warehouse robberies). This was the second year in a row in which televisions were the product most stolen on record. Of note, 61% of all electronics thefts occurred in the states of California, Florida and Texas.

Of the 899 cargo theft incidents recorded for that year with a known theft type, 724 (approximately 88%) were full truckload or container thefts. Warehouse burglaries declined slightly from 2009 figures, totaling 31 incidents in 2010 compared with 36 the previous year.

Cargo theft can take many forms such as the theft of a tractor and trailer, the theft of the trailer alone or the theft of cargo that is within the trailer. A preferred approach is to steal the trailer by disconnecting it from the tractor while the driver has stopped at a truck stop for a rest, bathroom stop or a meal. It has been reported that the thieves are able to disconnect a trailer and connect it to another tractor, or to steal both the tractor and trailer, in as little as 15 seconds and be on their way before the driver is aware of the event. During the process, the thieves can detect whether the trailer is transmitting information and jam or block the transmission thus preventing a remote site or the driver from learning that a theft is in progress.

The word trailer will be used herein to generally mean not only a trailer in the usual sense as an unpowered vehicle pulled by a powered vehicle but also any container capable of transporting cargo such as ships, barges, train cars and, where appropriate, airplanes. The focus of this invention is movable containers but many of the inventive ideas presented here are also applicable to fixed cargo containers such as storage tanks, warehouses and other buildings.

A further detailed discussion of background information is set forth in the applications listed above and incorporated by reference herein. All of the patents, patent applications, technical papers and other references referenced below and in the parent applications are incorporated herein by reference in their entirety. Various patents, patent applications, patent publications and other published documents are discussed below as background of the invention. No admission is made that any or all of these references are prior art and indeed, it is contemplated that they may not be available as prior art when interpreting 35 U.S.C. §102 in consideration of the claims of the present application.

There is considerable discussion herein on the use of transponders and coded transmitters. This is a fertile area for invention and it is contemplated that future patent applications related to this one will cover many of these inventions. In the meantime, the disclosures of the following U.S. patents and U.S. patent application publications constitute some of the key implementations of such coded transponders and transmitters: U.S. Pat. Nos. 5,917,423, 6,229,988, 7,106,211, 7,511,606, 7,536,169, 7,561,102, 7,664,462, and 20100277296.

Definitions in the Background of the Invention section of any of the above-mentioned applications are also generally, but not restrictively, applicable herein.

SUMMARY OF THE INVENTION

A method for interacting with a vehicle in accordance with the invention includes controlling interaction with the vehicle based on receipt of a signal by a component on the vehicle, and generating the signal based on biometric data entered via a portable communications device proximate the vehicle. The entered biometric data is preferably verified as biometric data of a driver of the vehicle prior to generating the signal, when it is the driver who is provided with sole access to the vehicle during transit to prevent theft of cargo being hauled by the vehicle. To address a situation where the driver temporarily steps away from the vehicle, for example, the vehicle may include a sensor within or associated therewith and the signal is a driver return message, in which case, the controlled interaction with the vehicle is sensing an identifiable biometric signature by the sensor. A processor on the vehicle controls interaction with the vehicle and may include a recognition system that receives the entered biometric data and allows movement of the vehicle, and/or access to the vehicle, only when the entered biometric data matches expected biometric data. To verify the biometric data, the entered biometric data may be transmitted to a remote site from the communications device at which it is entered and biometric data verification performed at the remote site. In this case, the signal based on the biometric data entered via the portable communications device proximate the vehicle may be generated at the remote site. The controlled interaction with the vehicle may entail maintaining a brake lockout mechanism coupled to at least one brake of the vehicle in a locked state until the signal is received and/or maintaining at least one door of the vehicle in a locked state until the signal is received.

A method for preventing theft of cargo from a vehicle transporting the cargo in accordance with the invention includes conditioning access to the vehicle or movement of the vehicle from an at rest state, on receipt of a signal, and generating the signal based on biometric data entered via a portable communications device proximate the vehicle. The entered biometric data should be verified as biometric data of a driver of the vehicle prior to generating the signal to enable access to the vehicle or movement of the vehicle from an at rest state. The same variations described above are also applicable to this method.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 6 illustrates a truck with a trailer and various mounting locations for cameras that monitor the environment exterior to the trailer.

FIG. 7 is a block diagram showing a process for controlling the trailer parking and emergency brake lockout system.

FIG. 8 illustrates a brake lockout mechanism for use with drum brakes.

FIGS. 9A-9E illustrate various aspects of the brake lockout mechanism.

FIGS. 10A-10C illustrate a brake lockout mechanism for use with disk brakes.

FIG. 11 illustrates a brake lockout mechanism as in FIG. 8 with the electronic controller mounted outside of the brake area and connected by a wire to stepping switch assembly.

DETAILED DESCRIPTION OF THE INVENTION

1. Definitions

Figure 1:
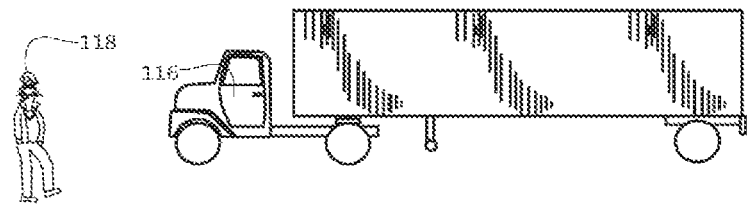
FIG. 1 illustrates a driver with a timed RFID approaching the tractor door of a truck.

Although many of the examples below relate to a cargo space in an asset, the invention is not limited to any particular space in any particular asset and is thus applicable to all types of assets including vehicles, shipping containers, and truck trailers regardless if they are pulled by tractors or are on boats, trains or planes. For the purposes of this disclosure, the word vehicle will be used to represent all such containers, trucks, trains, boats, airplanes, automobiles and other vehicles where appropriate.

Prior to describing the invention in detail, definitions of certain words or phrases used throughout this patent document will be defined: the terms "include" and "comprise", as well as derivatives thereof, mean inclusion without limitation; the term "or" is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller", "control module", "control unit", "processor" are generally synonymous and mean any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions of certain words and phrases are provided throughout this patent document, and those of ordinary skill in the art will understand that such definitions apply in many, if not most, instances to prior as well as future uses of such defined words and phrases.

The terms "trailer", "shipping container" or "container" will be used here as a generic cargo holder and will include all cargo holders including standard and non-standard containers, boats, trucks, trailers, tanks or any other movable object that can be used to transport cargo. Most of these "containers" are also vehicles or trailers as defined above.

2. Communication Systems

A trailer begins its journey with a cargo load and it is the goal of the system to guarantee that the trailer and its cargo arrive at its destination intact. Many incidents can occur along the way including theft of the tractor and trailer rig, theft of the trailer with the cargo and theft of the cargo alone. The achievement of this goal is based on the concept of changing the problem into an information problem. That is, to sense when a problem arises, that will prevent the goal from being reached, in a timely manner so that the crime can be stopped in progress. As long as the trailer does not encounter a problem, then no additional energy or cost need to be expended by the driver, owner, shipper or authorities.

Although many solutions have been proposed such as secure door locks and cargo items containing their own sensors and transmitters, all such systems are easily defeated by sophisticated thieves. Some such systems can delay a theft and others can track a stolen vehicle and thus can be useful additions to the basic system described herein. These will be discussed in some detail in later sections of this specification. The solution to be discussed here will concentrate on the information and communication system which will substantially achieve the goal of eliminating cargo theft.

A trailer equipped with the system of this invention can have a unique identification code, hereinafter called an ID, at least for the duration of the trip and preferably for the life of the trailer. This ID can form a key part of the message which will be periodically sent to a remote site using the chosen communication system which in the preferred implementation will be assumed to be the SMS system operating over a cell phone network. Other equivalent communication systems can be used including a direct connection to the Internet through a WiFi, WIMAX, LTE or other equivalent system. Additionally there are a number of text messaging systems coming on line to compete with SMS including those by Google and Apple as mentioned above. A vehicle may at any one time have access to several different communication channels and may choose the one that best meets the requirements at the time. These requirements can include security of communication and the particular channel can be chosen by the vehicle resident system and/or by the remote site. The chosen channel can change from time to time as the vehicle travels to its destination. The important feature is that some communication channel is available which has the properties that it will receive short messages and route them to their destination hereinafter referred to as the remote site. Each message sent by the vehicle can contain its ID, the destination for the message and at least an error code. Other information will of course be appended to the message consistent with the requirements of the particular channel chosen. Additionally, the ID and error code can be encrypted in such a manner that they cannot be easily faked or spoofed by a sophisticated thief. Thus, the receiving site can know for certain that this message was sent by a trailer having the unique ID.

An important feature of at least one of the preferred implementations of the inventions disclosed herein is the frequency of communication of the container status which can depend on various factors such as whether the vehicle is moving or stationary and if stationary whether it is waiting for a traffic control signal, stuck in traffic or parked. In addition to a communication frequency determined by a container resident algorithm, the frequency can also be controlled by commands from the remote site which may relate, for example, to the value of the cargo or to the theft probability. In general, the communication frequency will be less when the vehicle is traveling than when it is parked, for example, since most cargo theft occurs while the trailer is parked. Other factors that can be taken into account in determining the status communication frequency include whether the driver is present, the geographical location of the trailer, the time of day and whether an event has occurred. Events that can change the communication frequency include the sensing of an intrusion into the trailer, sensing of any change in the cargo within the container such as a change in position or presence of an item or of bulk cargo whether sensed ultrasonically, optically, electromagnetically or by a tag signal in response to an interrogation, or the change in the sensed internal environment. Other events that can change the communication frequency include events in the space outside but near to the trailer including the presence of another vehicle, the detachment of a trailer from its tractor, unexpected movement of the trailer, the approach of a human to the trailer, unexpected sounds, the starting of the engine by someone other than the driver, etc. Other factors related to the route traveled and schedule can affect the communication frequency such as an unexpected and unauthorized deviation from the planned route or an unexpected deviation from the planned schedule.

Generally, the transmission frequency will be low while the trailer is moving and on the expected route and on time, such as once per five minutes, and higher while the trailer is parked, and especially when the driver has departed from the tractor, or something unexpected has occurred, such as once per ten seconds. Keeping in mind that a trailer can be stolen in as short as fifteen seconds, wherever any of the above events occur the transmission frequency can be increased to once per second, for example. Due to the large number of transmissions from a trailer contemplated herein, it is important that each message be kept short so as to minimize the required bandwidth.

The error code which is sent can indicate that no event has occurred and that the container is on the proper route and on time, an OK error. When the software at the remote site receives such a message it updates the status of the trailer on an internet accessible file and takes no further action. If there is an event, then the OK message can be changed to give a report of the event and whether it is likely to be associated with an attempted theft, accident or other serious incident. If the event is a schedule delay the remote site software can check on weather and traffic conditions on the route and decide whether further action is warranted. The trailer can transmit its location on request by the remote site software or the entire planned route can be uploaded to the remote site along with an estimate of the delay. In the latter case only the delay needs to be modified. Alternately, the trailer can upload a code representing a shipping company pre-designated route and a subsequent code of an alternate pre-designated route if weather or traffic conditions warrant a route change. If the delay is deemed significant, based on parameters set by the shipping company, then the software can alert the shipping company or other interested party according to the programmed instructions from the shipping company. For more serious error codes other actions can be initiated as per the programmed instructions. These actions can include sending email, text messages or automated phone call to the driver and other interested parties and notifying the authorities that a theft is in progress or an accident has occurred. The location of the vehicle can also be a single OK bit if it is on the expected route and on schedule within certain programmed tolerances.

Sophisticated thieves can invoke jamming transmissions as soon as they are aware that the trailer is transmitting information to the infrastructure. Various spread spectrum, frequency hopping or impulse radar techniques can be employed to prevent or reduce the effects of jamming but that requires significant additions to the vehicle or infrastructure. The thieves can also attempt to locate the transmitter and disable it or otherwise prevent it from transmitting. In this event the remote station that has been receiving the messages can assume that a theft is in progress and take appropriate actions. Since a trailer can be stolen in as little as 15 seconds the remote station has little time to act. In many cases, for example, this is insufficient time for law enforcement authorities to travel to the last know location of the trailer. By the time that they arrive the trailer is long gone. This issue will be discussed below.

Basically, in a preferred implementation of the invention, an OK message is sent to the remote site on an established schedule that indicates that the cargo has not been disturbed, there has not been an intrusion into the trailer, the authorized driver is present and alone in the cab, the trailer is moving on the expected route and on schedule and there has been no other event that might signify a problem. The message also contains the trailer ID and is sent encrypted in such a manner that it cannot be spoofed. The encryption can be controlled by the remote site through a pseudorandom number public key transmission such that the coded message cannot be decoded except by the remote site and thus cannot be spoofed.

Occasionally the message can be blocked and thus not reach the remote site when expected. In that event the software can check whether the vehicle is in a known problem area such as a tunnel and if so request a retransmission. If a retransmission is not received in a reasonable time or if there is no known natural blockage, then the software can invoke or evoke the theft in progress algorithm. Thus, a key feature of this preferred implementation of this invention is to assume that there is a theft-in-progress whenever an expected message is not received as well as when a problem is indicated by the error code. The action to be taken when either event occurs will depend in instructions from the shipping company. The remote site software knows when to expect a message since the time of the next message can be part of the message sent by the trailer. At any time that an expected message is not received, the remote site can send a command to the trailer requesting a retransmission.

The magnitude to the cargo theft problem may stimulate the government or other interested group to install communication transceivers along roads where it is known that communication is otherwise nonexistent, such as in long tunnels.

The trailer can have a resident processor that for a particular trip can be programmed to contain information relating to the trailer ID, the authorized Tractor ID, the cargo and how it is identified by the cargo sensors, if present, and the expected output including tolerances of all the resident sensors. The particular suite of resident sensors will of course depend on the shipping company and the nature and value of the cargo.

The processor needs to know what to expect from each of the sensors in the suite so that it knows that a particular output from a particular sensor indicated intrusion into the trailer, for example. As long as the expected values are received the processor knows to send an encrypted OK error code. Similarly the processor is programmed to send the proper code relative to the sensor output if it is not what is expected. One of the inputs to the processor can be the authorized driver. The identification of the driver will be discussed below but in general the recognition system can be as simple as a password or as complicated as a fingerprint, palm or butt print, iris scan, voice print, gesture or other biometric identification. In addition to the sending of an error code, operation of the rig can be controlled based on the authorization of the driver. Similarly the tractor ID can be transmitted to the trailer in a variety of un-spoofable ways so that an error code is generated if the wrong tractor is attached to the trailer.

The planned route can also be entered into and stored in the processor and a GPS receiver, also attached to the processor, can track the trailer and compare its actual location with the planned location and send an error code if there is a discrepancy beyond the established tolerance. This comparison of the planned versus actual route can also be performed at the remote site. The data required by the processor can be entered either by the shipping company when the trailer is loaded, at the start of the trip or at any other convenient time. When the driver is ready to leave the embarkation location, for example, he can phone the shipping company home office which can then wirelessly communicate with the processor downloading the required data in encrypted form. The decrypting key can also be transmitted in a manner that cannot be used by a potential thief as is well known to encryption experts or it can be resident in the processor memory.

In the above manner, the trailer can be digitally connected with the tractor and the driver such that if any unauthorized change is made to either an error code is sent to the remote site for resolution. If no message is received the remote site software also acts as if a theft-in-progress code was received. The shipping or other authorized persons can access the status and location of the container via the internet at any time to check on the shipment and its properties consistent with the onboard sensor suite. Thus the information system is in place to determine in a manner of seconds or minutes whether a theft has occurred or is occurring. Additionally, suitable security can be provided to ensure that this information is not freely available to the general public. Redundancy can be provided to prevent the destruction or any failure of a particular remote site as is now common in cloud based systems.

Examples

Simple Cargo Movement

The simplest method of implementing a portion of the invention is to use a cell phone, smartphone, PDA, tablet computer or other portable device with the appropriate application. Cell phones, or smartphones, that are now sold contain a GPS-based location system as do many other devices such as PDAs, iPADs, tablets or equivalents. Such a system along with minimal additional apparatus can be used to practice the teachings disclosed herein. In this case, the cell phone, PDA or similar portable device can be mounted through a snap-in attachment system, for example, wherein one or more portable devices can be firmly attached to the container and perhaps inside the tractor. The device(s) can at that point, for example, obtain an ID number from the container through a variety of methods such as a wireless RFID, SAW or hardwired based system. It can also connect to a chosen remote site using SMS text messaging or similar system. Since the portable device would only operate on a low duty cycle, the battery should last for many days or perhaps longer. Of course, if it is connected to the vehicle power system, its life can be indefinite. When power is waning, this fact can be sent to the cell phone system to alert the appropriate personnel. Since a cell phone contains a microphone, it can be trained, using an appropriate pattern recognition system, to recognize the sound of an accident, other sounds indicative of an intrusion such as forced entry or an unfamiliar voice, the deployment of an airbag or similar event. It thus becomes a very low cost OnStar® type telematics system as well as a theft notification and prevention system. The GPS system can be used to sense vehicle motion and to track the trailer on its route.

Receiving software can be established at the chosen remote site to provide most of the functions described herein for the more professional system. All of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® or Sync can of course also be used with this system. The device would of course be accessible to a thief but disabling it would still be difficult since once programmed and the system initiated, the remote site could take action if it received an error message or no message at all. Deviation from the planned route and unexpected delays can also be dealt with as above. Changes in the monitoring functions can be controlled by the shipping company and be out of control of the driver. Thus, any interruption in the planned trip can trigger an alarm and evoke remedial action to stop the theft-on-progress.

Additionally, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen container location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, butt print, palm print, voice print, gesture, facial or iris recognition etc. thereby giving that capability to vehicles and improving the functioning of the theft prevention system (see the discussion below with respect to FIG. 12). The device can thus become the general key to the vehicle. In particular, it can be used to positively identify the authorized driver of a tractor and then automatically unlock the vehicle door as the driver approaches and lock it as he leaves the vehicle. A biometric-based vehicle access, and more specifically, vehicle unlocking device is therefore provided. If the cell phone is lost, its whereabouts can be instantly found since it has a GPS receiver and thus knows where it is. If it is stolen, it will become inoperable without the biometric identification from the authorized driver or wireless authorization from the owner or shipper.

Using the any of the various communication systems described above, an automatic crash notification system can be built. The crash can be sensed by the airbag crash or rollover sensors or the deployment of the airbag event can be sensed to trigger the communication of the event. The system can be powered by the vehicle power or a battery can be used that has a very long life since the system can be designed to draw little current until the event. Cell phones are now common that need infrequent charging such as once per week. An advantage of a self-powered system is that it can be more easily retrofitted to existing vehicles. Additionally, a self-powered system would still operate on the loss of vehicle power which can happen during a crash. It may be desirable to continue to transmit emergency notification signals even after the crash or trailer theft if help does not arrive or to communicate with the crashed vehicle to obtain confirming or additional information. In the event of a crash or theft, the trailer can be triggered to periodically emit a wireless signal on one or a variety of frequencies which can be used to help locate the trailer by appropriate emergency vehicles or the police, and so chosen so that they are difficult to defeat or otherwise immobilize.

This self-contained system can use a microphone, for example, to sense a theft, crash, rollover or airbag deployment and thus the only wiring required would be to the communication system which also could be contained within the unit. In some cases, the unit can be on a vehicle bus, such as the safety bus, where it can derive both power and crash information. A backup power supply in the form of a battery, capacitor or fuel cell can also be provided. The communication system can be any of those mentioned above including cellular phone system perhaps using text messaging such as SMS or, preferably, a ubiquitous internet system such as LTE or WiMAX. Such a ubiquitous system is not yet in service but the inventors believe that the arguments for such a system are overwhelming at least partially due to the inventions disclosed herein and thus it will occur probably in time for the deployment of a universal automatic crash or theft notification system as described herein.

Summary

Once the remote site has received a message from the sensor system disclosed herein, it can make available the data on the internet where subscribers or other authorized parties can retrieve the data and use it for their own purposes. Since such sensor systems are novel to at least one of the inventions disclosed herein, the transmission of the data via the internet, or via the communication channels disclosed here and the SMS or other texting technology, and the business model of providing such data to subscribing customers and other authorized users either on an as-needed basis or on a push basis where the customer receives an alert or other information, is also novel. Thus, for example, an interested party may receive an urgent automatically-generated e-mail message, phone call or even a pop-up message on a particular screen that there is a problem with a particular asset that needs immediate attention. In some cases the remote site software may require an acknowledgment which if not received can cause the site to make further attempts to notify the interested party. The interested party can be a subscriber, a law enforcement facility, or an emergency services facility, among others.

The initial communication system will probably use the SMS or similar text messaging system where the sender ID is its phone number. Thus, the phone number can also be the trailer ID number at least in early deployed systems. In the event the phone number of the device will need to be changed if the hardware is moved from one trailer to another as could easily be the case when the device is a iPhone®, iPad® or equivalent. Under these circumstances the trailer would need to have an ID different from the phone number and a list pairing trailer IDs, which hopefully would reside on a trailer resident RFID or similar device, with the sending phone numbers. Each time a trip is initiated, in this case, the first transmission to the remote site would need to contain the pairing of the phone number with the RFID, or equivalent, read trailer ID. Naturally, this needs to be done with some care to prevent spoofing.

Another form of communication to be activated in the event of an attempted or actual theft is to position one or more auxiliary transmitters on the trailer which can be remotely triggered in the event that the primary system has been disabled. These transmitters can operate at different frequencies and/or use frequency hopping or transmit as ultra-wideband devices and can serve as beacons to enable the authorities, drones or other truckers to locate and track a stolen trailer. If several such devices are hidden on the trailer, then as each one is silenced, another can take over. This will be discussed in more detail below.

3. On Vehicle Theft Countermeasures

The invention described in this section principally relates to theft prevention systems for trailers, particularly those used in an over-the-road tractor-trailer vehicle combination commonly referred to as an "18-wheeler". These trailers are almost universally provided with pneumatic braking systems which include a parking/emergency brake with brake shoes, in the case of drum brakes, or brake pads carried by a caliper, in the case of disk brakes, urged to the braking position by spring means in the absence of pneumatic pressure supplied to the braking system.

In this common arrangement, a parked trailer being disconnected from the tractor vehicle with its source of air pressure will have its parking/emergency brakes urged to full braking position preventing the trailer from rolling or being moved. However, the trailer can be moved by any standard tractor vehicle having the usual air hose and electrical connections. Once a tractor is connected with its air hoses to the trailer and the trailer braking system is pressurized, the parking brakes air pressure causes the spring forces to be overcome so that the parking brakes are no longer applied.

Numerous designs have been employed to prevent or deter theft of a parked trailer, including systems which require some action in addition to connecting air and power lines. Some of the theft deterrent systems incorporate a solenoid or motor operated valve in the appropriate air line between the tractor and the trailer wheels and have a key lock switch or other device required to energize the solenoid or motor. The valve will open when the key switch is closed to allow air pressure from the tractor to release the brakes on the wheels of the trailer. However, even if a key is required for the valve to operate, the system can be easily defeated by braking into the valve housing and shorting the key switch or, in the case where this is not accessible, by bypassing the valve with a new air hose. The air line is always accessible somewhere in its path from the tractor to the brakes. The line is cut and a new line that bypasses the key valve installed. Such an action can generally be accomplished in a few minutes or less with the proper tools.

Various countermeasures such as vehicle immobilization can be used to remotely disable a stolen vehicle and aid in its recovery. Other known countermeasures include king pin locks that prevent the tractor and trailer from being separated, air brake valve locks that prevent brake release, and glad hand locks that lock the trailer's air line. Seals also limit intrusion and create an alert that doors have been tampered with. This fact can be sensed and reported off site through the communication system described herein, for example. Other countermeasures include causing one or more tires to deflate, sounding an alarm, disabling the power train or locking the brakes are possible but once the thieves learn about any of these countermeasures they will develop a method of defeating them. At the very least, fleets should be using tamper-proof locks and door hinges. Most, if not all, of the truck manufacturers now offer password-protected ignition lockout systems.

The first new countermeasure that can be used is to notify the driver that a theft is in progress which can be triggered by any of the events described elsewhere herein. Thieves are reluctant to steal a trailer if the driver is present as this can lead to an armed robbery or another felony. If the trailer is in an area where other truckers are present, then notifying all trucks in the vicinity can cause one or more trucks to attempt to block the motion of the stolen trailer or, as a minimum, to follow it and report its location until the authorities arrive. Naturally, a reward can be given to a trucker that successfully prevents a cargo theft.

Sophisticated thieves can determine a fix for most any countermeasure that is installed on a trailer. Nevertheless, each of these fixes or work-arounds consumes time which makes their capture more likely. One such countermeasure can involve rendering the trailer unmovable such as by locking the brakes, making the tires flat, immobilizing one or more axels, preventing the trailer from turning etc. If, for example, a device is placed on the trailer that engaged the emergency or parking brake system by depleting the compressed air from the compressed air cylinder that feeds the emergency or parking brakes whenever the trailer was parked and/or detached from the appropriate tractor, then stealing the trailer would be rendered more difficult. Naturally, the thieves can devise a method to supply air to the lines that feed the emergency brakes or they can otherwise modify the brakes so that they disengage but this will consume time. What follows is a description of a typical air brake system from Wikipedia.

"Compressed air brake systems are typically used on heavy trucks and buses (Note the difference between pneumatic brakes and pneumatic/hydraulic). The system consists of service brakes, parking brakes, a control pedal, an engine-driven air compressor and a compressed air storage tank. For the parking brake, there is a disc or drum brake arrangement which is designed to be held in the 'applied' position by spring pressure. Air pressure must be produced to release these "spring brake" parking brakes. For the service brakes (the ones used while driving for slowing or stopping) to be applied, the brake pedal is pushed, routing the air under pressure (approximately 100-125 psi) to the brake chamber, causing the brake to reduce wheel rotation speed. Most types of truck air brakes are drum units, though there is an increasing trend towards the use of disc brakes in this application. The air compressor draws filtered air from the atmosphere and forces it into high-pressure reservoirs at around 120 PSI. Most heavy vehicles have a gauge within the driver's view, indicating the availability of air pressure for safe vehicle operation, often including warning tones or lights. Setting of the parking/emergency brake releases the pressurized air pressure in the lines between the compressed air storage tank and the brakes, thus actuating the (spring brake) parking braking hardware. An air pressure failure at any point would apply full spring brake pressure immediately.

"Brakes are applied by pushing down the brake pedal. (It is also called the foot valve or treadle valve.) Pushing the pedal down harder applies more air pressure. Letting up on the brake pedal reduces the air pressure and releases the brakes. Releasing the brakes lets some compressed air go out of the system, so the air pressure in the tanks is reduced. It must be made up by the air compressor. Pressing and releasing the pedal unnecessarily can let air out faster than the compressor can replace it. If the pressure gets too low, the brakes won't work.

"These large vehicles also have an emergency brake system, in which the compressed air holds back a mechanical force (usually a spring) which will otherwise engage the brakes. Hence, if air pressure is lost for any reason, the brakes will engage and bring the vehicle to a stop."

Figure 5:
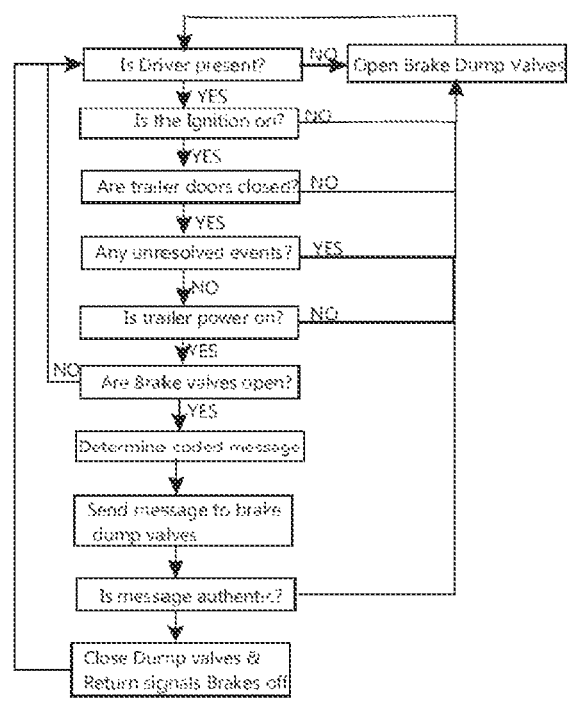
FIG. 5 is a block diagram showing a process for controlling the trailer parking and emergency brake dump valves.

Not all trailers have emergency or parking brake systems that engage the brakes when a source of air pressure is not present. For those that do not, a radio-activated valve and/or explosive device within the vehicle tires can perform a similar function at the cost of possible tire replacement. However, most modern trailers especially those carrying high value cargo do have such systems and thus only such systems will be addressed in this section. Since every system that can be devised can also be circumvented by determined and sophisticated thieves the goal here is to render the circumvention as time consuming as possible. FIG. 5 illustrates a block diagram of such a system.

The compressed air required to release an emergency or parking brake flows through a brake dump valve at the airbrake assembly at each wheel as described in U.S. Pat. No. 6,923,509. A wire connects each of the dump valves to the trailer power cable which in turn connects to the power supply cable from the tractor. Information to indicate to each dump valve to close allowing air pressure to release the brake can be transmitted from the tractor either wirelessly, in which case an antenna would be present on the trailer to receive the wireless transmission and a corresponding antenna on the tractor, as a modulated signal over the power cable or on a separate wire. Each dump valve responds to the proper message from the tractor and if it received the proper message, then the valve opens or closes depending on the message. In an implementation of the invention in the '509 patent in conjunction with the teachings herein, the message can also be sent by a remote site or by the driver with a hand held device such as a smart phone. The SMS protocol can be used as discussed above. If power is disconnected then the valve can open dumping the compressed air and engaging the brakes. Thus, if any of the valves do not receive the proper message, then the brakes are engaged and the trailer is unable to be moved. The coded message can change from transmission to transmission as known to those in the art of wireless entry fobs making it difficult or impossible for a spoofing transmitter to operate the valves. Since each valve can have its own ECU for receiving and decoding the messages and each ECU is attached to the valve, disabling the system may require disassembling each airbrake device at each of the tires and/or requires dismounting some or all of the tires which is a time consuming process.

However, the system can alternatively be simply disabled by severing the rod from the airbrake system to the drum or disk brake mechanism. With the proper tools this can be done in perhaps less than a minute thereby defeating the system and allowing driving off with the stolen cargo trailer. Although the remote site may be aware that a theft is in progress, depending on the sensor suit on the trailer, there is probably insufficient time to prevent it and the remote site may not even be aware of the theft until the trailer is on its way. The thief will have to drive the trailer without functioning brakes but if the load is light, and the roads level, this may not interfere significantly with his driving maneuverability especially if the distance to a staging location such as a warehouse is short. Various sensors can be placed on the brake mechanism that can indicate that the brake has been released but again this allows little time to stop the theft.

All of the theft prevention systems based on immobilization so far described in the prior art can thus be easily defeated by a thief with the proper equipment. What is needed, therefore, is a system that results in a considerable delay before a trailer can be moved. Two such systems will now be described based on systems that mechanically lock the brakes in the engaged position and require the removal of the trailer wheels to obtain access and allow disablement. The removal of a wheel requires jacking the trailer at each wheel and the removal of many nuts, which forces the thief to consume considerable time. Appropriate sensors coupled with the communication system indicate that such an action is in progress and thus the remote site is provided significant time to take theft prevention actions such as informing the law enforcement authorities in the area. In fact, with appropriate sensors, before the thief begins the remote monitoring site is aware that a theft is in progress there should be ample time for law enforcement personnel to arrive before the trailer can be moved. Various additional techniques can be employed to further retard the tire removal process such as the use of locked lug nuts or nuts with an unusual profile requiring special tools for their removal.

Looking now at a drum brake locking system as shown in FIGS. 8 and 9A-9E. FIGS. 9A-9E illustrate the use of a ratchet wheel 801 in conjunction with a drum brake shown generally at 800 in FIG. 8. Pawls 802 engage with the ratchet wheel when the parking brake is activated and prevent rotation of an S-Cam 803 until they are withdrawn by an activating solenoid 804. The activating solenoid 804 is controlled by a brake lockout controller 805 which receives messages from the communication system as elsewhere herein. The brake lockout mechanism is situated and shielded with a plate and mud guard 820 such that removal of the associated wheel is required to gain access to and defeat the brake lockout device. The controller 805 contains a processor and circuitry which is configured to decode signals sent either wirelessly, over the vehicle power line or on a dedicated communication wire from either a device located on the vehicle tractor or another device which may be portable, such as a smartphone, or remote from the vehicle.

It is important to note that for some heavy duty trailers, the brake area can achieve temperatures as high as 300 degrees Celsius which is sufficient to destroy or immobilize most electronic systems. In most cases the brake locking system will only be activated after the trailer has come to rest and cooled down. Thermally activated mechanical switches can prevent the circuitry from being powered until the temperature has reached a safe to operate level. Nevertheless, just exposure to these temperatures can destroy or make permanent changes to the electrical characteristics of various components that make up common electrical and electronic circuits. Circuits can be constructed of special materials such as gallium arsenide but this can have a significant effect on the cost and reliability of such components and circuits. For those vehicles where excessive temperatures can occur in the brake areas, therefore, an alternative approach is required. Such systems can place the electronic controller 805 outside of the brake area and attach it to the ratchet moving solenoids or motors through wires to an electromechanical based decoding mechanism located within the brake area. In this case, the controller 805 will send a coded signal over the power line, or through dedicated wires, to the ratchet mechanism which will go first through a mechanical decoding mechanism and if the mechanism experiences the proper code it will connect the power to the ratchet solenoids or motors in such a manner as to engage or release the ratchet wheel as desired. In one implementation, for example, the current to drive the pawl solenoids or motors is controlled by an assembly of three stepping switches designed to operate in a high temperature environment. When the stepping switches are all at their "0" or at home position, current can be provided to the solenoids or motors to cause the pawls to engage the ratchet wheels. When the ratchet wheels are so engaged a mechanical switch engaged by the motion of the pawl rods turns off the current causing the ratchet wheels to remain locked. Later, when the controller 805 sends the proper number of pulses to each of the three stepping switches, the current is caused to flow to the solenoids or motors to cause the ratchet wheels to be released. Again, a mechanical switch at the end to the solenoid or motor rod turns the current off. If each stepping switch has 50 positions, then the number of possible codes to release the brake locks is 125,000. If it takes 0.1 seconds to step each of the stepping switches, then it would take over 3 minutes to try all combinations. Additional delays can be inserted such as turning the current on when the switch is supposed to be in the release position and if it is not a 1 minute delay can be inserted by those skilled in the art. Each wheel would have a unique code for releasing the brake lock which would be sent by the controller 805 from information sent by the coded transmission system.

The use of remote electronics and stepping motor operated switches is illustrated in FIG. 11 wherein the electronic controller 805 has been removed from the brake area where high temperatures can be experienced, to a convenient location outside of this area. A wire 812 connects the controller to an assembly of three motorized high temperature stepping switches 811 which are connected to the pawl motors or solenoids by appropriate wires (not shown). A wireless connection is also possible.

The pawls 802 and ratchet wheel 801 are designed so that when the pawls 802 are engaged, the ratchet wheel 801 can rotate in a clockwise direction in the figure without disengaging the pawls 802 from the ratchet wheel 801 but not in the counterclockwise direction. Thus, the force exerted on the brake pads by the S-Cam 803 can increase as the brakes are applied but not decreased without removal of the pawls 802. Thus, once the brakes are applied they are locked in place until the solenoid or motor is activated to remove the pawls 802 from locking the ratchet wheel 801.

The solenoid assembly is designed as a bi-stable system. When the current in the activating coil 806 is applied in one direction, it will cause the magnetized solenoid armature to withdraw the pawls 802 from engagement with the ratchet wheel 801 and when the current is applied in the other direction, the pawls 802 are forced into engagement with the ratchet wheel 801. After the solenoid arm is caused to move in one or the other direction, it is detented into position by detent balls 807 which engage with grooves 808 or 809 under a force supplied by spring 810. Groove 809 is slanted so as to urge the solenoid armature toward the ratchet wheel 801 so that the pawl 802 is spring-biased toward engagement to allow for tolerances and the case where the pawl 802 rests on top of a ratchet wheel tooth. The pawls 802 can be slightly displaced from one another as shown in FIG. 9E so that in the rare case when the teeth of a pawl 802 land on the teeth of the ratchet wheel 801, only one of the pawls 802 can temporarily hang up. Additionally, the ratchet wheel teeth can be removed from a portion of the wheel that corresponds to the brake off condition so that if for any reason the system fails and tries to engage the lock when the brake in not activated, it cannot do so and thus create an unsafe brake locking condition. Other fail-safe mechanisms can additionally be employed depending on safety requirements including, for example, a lockout of the system if the vehicle wheel is moving.

This design, therefore, locks each wheel where it is implemented to prevent movement of a trailer or tractor unless the proper electronic signal is received by the controller 805. This signal can emanate from a smartphone in the possession of the authorized driver, for example, and be transmitted wirelessly to the controller 805. The smartphone can contain a face, palm or fingerprint recognition capability, for example, to verify the identity of the operator of the smartphone (which capability is provided by a biometric sensor). Once the proper coded signal is received by the controller 805, a current is sent to the solenoid coil in the proper direction to cause the pawls to be removed from engaging the ratchet wheel releasing the brake lock. To defeat the system, a thief must remove the wheel which is a time consuming activity. Such a system can be applied to one or more of the wheels in a simple retrofit manner to increase the difficulty of theft to any degree desired. Of course, systems other than a smartphone can implement the same or similar strategies such as a vehicle tractor-resident system or a system that requires authorization from a remote site. When the chance of theft is minimum such as when the trailer is empty or located in a secure holding yard, the authorized driver or remote site can issue a coded command which removes the pawls 802 from engagement with the ratchet wheel 801 and disables the system until it is enabled again. The state of the system can be coded into the SMS messages sent to the remote site. In normal operation, the pawls 802 will automatically engage whenever some event such as engine shutoff occurs and to disengage the pawls 802 requires the receipt of the proper coded message. The coded message can be chosen so that it varies in a known pseudo random manner to make it difficult or impossible to spoof.

The solenoids are configured such that they can act in a bidirectional manner and remain in either the engaged on disengaged state when no power is present. This prevents the accidental operation of the brake lock system if power is accidently removed from the locking system when the vehicle is in motion, for example. Also, the brakes will remain locked in the absence of power indefinitely preventing movement of the vehicle until power is supplied and the proper coded message received by the controller 805.

To achieve the bidirectional feature, an upper portion 821 of the solenoid rod either is made from magnetized magnetic material or comprises a permanent magnet. Portion 821 is magnetized along its axis such that a current in one direction in the coil 806 causes the solenoid rod to move downward as shown in FIG. 9C or upward as shown in FIG. 9D. FIGS. 9C and 9D show metal brackets 822 that attach the pawls 802 in a movable manner to the drum brake 800, its housing or other mounting structure. Although for simplicity a solenoid version of the invention has been illustrated, the preferred approach is to use a small motor to move the pawl into engagement and disengagement. The motor can operate through a rack and pinion, worm gear or cycloidal drive as is known to those skilled in the art for transforming the high speed, low torque of a motor to a high force slow linear motion of a rod. Many other mechanisms are available to move a pawl or equivalent into engagement with the ratchet wheel some involving linear and other involving rotary motion. The detent balls and grooves in general might not be necessary when motors are used since the rod is unlikely to move when the motor is not powered.

FIGS. 10A-10C illustrate a mechanism for use with disk brakes which similarly prevents rotation of the disk rotor when engaged. In this design two solenoid pins are inserted along radii into the disk rotor itself such that the rotor is prevented from rotating. The solenoid pins 835 are removed by the electric currents in the appropriate activating coils under direction of a brake lockout control module (not shown) in a similar manner as with the drum brake system of FIG. 8. The solenoid driven pins 835 engage the disk rotor 831 in the radial slots 834 provided in the disk rotor 831. The solenoid assemblies can be attached on either side of the caliper 832 as shown in FIG. 10C or in some other appropriate mounting configuration. In some cases a single solenoid assembly is sufficient and in others more than two can be used. For cases where the disk rotor does not have radial slots an alternative arrangement can be used such as providing holes or slots through the disk rotor parallel to the rotation axis or to mount a ratchet wheel to the face of the disk rotor. In the axial parallel holes case the rotor may need to rotate some amount before the pins enter the appropriate hole and thus there would need to be a force provided such as by an angled ball detent grove to urge the pin into a hole without the need for continuous power. This would operate in a similar manner as the ball detents in the ratchet wheel example of the drum brake ratchet wheel case.

Naturally many other designs will now become obvious to those skilled in the art for mechanisms which in a similar manner lock the brakes in an engaged position or otherwise prevent a wheel from rotating when commanded to do so by an appropriate control module. Pins can be inserted into the brake drum under solenoid or motor control to prevent it from rotating as in the disk case or the brake pads in the disk brake caliper can be held against the rotor by appropriate motor based designs. In general bidirectional motors, stepping motors or other actuators can be used where solenoids are illustrated in the figures. The basic principle in each case is to lock the wheel in such a manner as to prevent it from rotating until an appropriate message has been received by the control module and to do so in such a manner that the thief cannot access the mechanism without removal of the vehicle wheel. Since removal of the wheel is time consuming the theft is delayed. If the system is put on multiple wheels further delay results. Any of a wide variety of sensors can be used to detect that a wheel removal is in process and that fact can be coded into the SMS or equivalent message periodically sent to the remote site. Examples of such sensors are: an acoustic or vibration sensor located where it can sense the noise or vibration associated with removal of a wheel, an accelerometer or angle sensor which indicated that the trailer is being jacked up, a strain gage on the airbrake rod indicating that the force from the airbrake to the brake mechanism has been reduced, and others. If the remote site does not receive the expected message or if it receives the message with the theft-in-progress code, then it can initiate the process of preventing the theft.

The creation of the brake lockout code can be done either in the tractor, on a smart wireless RFID fob or by a cell phone or smartphone. In the latter case, the monitoring office can compose the coded message and transmit it to the driver's cell phone after verifying that the driver is in possession of his cell phone, is in the tractor and has not been abducted. In this manner, trailer security is significantly enhanced. A biometric sensor such as a fingerprint, palm, face or voice recognition system, can be used with the transmitting device to verify the driver, i.e., on the driver's cell phone or smartphone.

The brakes lockout should be set in this manner whenever the driver is absent. Additionally the brakes can be engaged if anything goes wrong however care must be exercised if the trailer is in motion so as not to cause an accident or facilitate a theft of the cargo.

There are situations when the brake lockout system may have to be disabled. When the trailer is dropped off in a secure drop yard such when it is to be loaded onto a container ship, ferry, rail car or other transportation means or when the shipper is being changed such as can happen at a border. This situation is known in advance and the lockout device can be automatically disabled for so long as the trailer is located in the secure drop yard. This can be accomplished merely by the trailer knowing its GPS location, via a location or position determining system arranged on the trailer or elsewhere with the resultant location determination being provided to the trailer, and that within a certain geographical area that the lockout system is to be deactivated. In other cases, a remote site can send a coded message to disable the lockout system or can provide authorization to the driver to do so under controlled conditions. The controlled conditions can include again geographical location and time duration. The lockout provision can also be disabled when the trailer is empty or at a secure location where it is being loaded or unloaded, that is, prior to the start of the planned trip or after it has arrived at its final destination and responsibility is removed from the shipping company. This lockout feature should also be suppressed while the trailer is in motion so as not to cause an accident.

In operation, the driver approaches or enters the cab and either manually sends a coded control signal to the brake lockout controller or the system in the tractor does this automatically once the driver has been identified. In the second case the driver does nothing different than he would do with a non-equipped trailer. If a non-system equipment truck or tractor or one without the proper authorization, attempts to move a protected trailer, the driver will find that the brakes cannot be released normally by applying pressure to the parking air supply line in the absence of a coded signal transmitted to the brake lockout controller at each equipped wheel. The lockout system described herein is not limited to single trailer rigs and may readily be adapted to provide security for one or more tandem trailers and additionally for the tractor.

4. Driver Identification

The presence and identification of people can be derived using various devices, such as, in the simplest form, by analysis of information from RFID devices carried by an authorized driver or mounted to the vehicle's structure such as the seats, and then transmitted off of the vehicle. This concept is disclosed in U.S. Pat. No. 5,829,782, along with the presence of tags and tag monitors inside a vehicle. Thus, the presence of an authorized driver can be verified as well as the presence of other unauthorized occupants of the trailer determined by identification devices and/or occupant sensors. Thus, if the driver is being abducted and another person is residing within the cab, this information can be sent to the remote site for remedial action.

Since the most vulnerable time for trailer or cargo theft is when the trailer is left unattended, an additional protection can be obtained if the tractor can identify that the driver is present either in the cab or at least near to the tractor, i.e., as a function of distance between the driver and the tractor or cab. This distance may be ascertainable by providing the driver with a portable device that cooperates with a device on the tractor or cab, e.g., a transponder/interrogator system. The message rate and/or monitoring frequency can be reduced once the driver is known to be inside the tractor and the engine is started. The message rate and/or monitoring frequency can also be varied (reduced or increased) based on a condition of the vehicle, the presence of a driver inside the vehicle, a distance between a driver of the vehicle and the vehicle, determination that the vehicle is at rest after motion of the vehicle stops, and a location of the vehicle. In the latter case, the location of the vehicle can be determined using an onboard location-determining system and the determined location provided to a processor that determines the modification to the transmission rate of the messages.

The condition of the vehicle that causes a change in the message rate or monitoring frequency may be a deviation of the vehicle from an expected route, as determined by a processor that compares the current position of the vehicle obtained by a, for example, GPS device, to the expected position.

The condition of the vehicle that causes a change in the message rate or monitoring frequency may be a biometric identification of a driver of the vehicle. In this case, the biometric identification of the driver is installed or incorporated onto a portable electronic communication or processing device that is carried by the driver when the vehicle is in transit.

The message rate or monitoring frequency may be changed based on current time, current vehicle or driver location and/or weather around the vehicle. It may also be changed based on a property of an item of cargo inside the container. It is also possible to detect a property of the vehicle using at least one sensor and modify a rate of transmission of the messages by the transmitter based on the detected property of the vehicle. The sensor may be arranged in or on the container to detect information about a property of the container or a property of an environment in or around the container and then interrogated by an interrogator to obtain information about a property monitored by the sensor at a frequency that is independent of the periodic transmission of messages by the transmitter. The sensor may detect information about a property of the container or a property of an environment in or around the container and commands directed from a remote site to the container to cause the sensor to be interrogated and obtain information about a property monitored by the sensor.

The coded message can contain a code bit that relates the status of the driver. Is he present in the driver seat, etc? The sensing of the authorized driver can be accomplished in a variety of ways such as by sensing that a person approaching the trailer, and presumably the driver is carrying an RFID tag, smart card and/or other identification that can communicate with the tractor. The driver's smart phone, for example, can be used for this purpose. Whatever transmission message that is sent from the driver should be a variable message that cannot be easily decoded or spoofed by a thief. If a cellphone is used, for example, it would be best that the cellphone has a required password before a transmission can occur. An alternative would be for the cell phone and/or other device to have a biometric sensor such as a fingerprint, voice recognizer, hand or palm print, or face recognition sensor to authenticate the driver. An alternate approach is to wait for the driver to enter the cab and then require either the entry of a password or the use of a biometric sensor such as a camera with face or palm recognition capabilities or a butt print system mounted within the seat bottom. Once a positive ID has been achieved and the tractor and trailer is mobile, then the transmission rate can again be reduced. Of course the driver should have a panic button to signal that there is a problem and the transfer rate can again be increased and an error code sent. Another approach to ID the driver would be for the remote site to send a code to the driver's cell phone and a corresponding code to the trailer as in public key encryption systems. The driver can then activate the vehicle with a unique unspoofable coded transmission from his smart phone.

A particularly appropriate biometric identification method can employ the Fujitsu PalmSecure technology which uses palm print recognition technology as reported in the MIT Technology Review Blog "Beyond Cell Phone Wallets, Biometrics Promise Truly Wallet-Free Future". The Fujitsu PalmSecure technology is a palm vein based strong authentication solution that utilizes the vascular pattern of a person's palm. This device can be mounted in the cab of the tractor, on a cell phone, PDA or equivalent portable device or other convenient location. When the device recognizes the palm print of the operator it can send a coded message which permits deactivation of immobilization devices and the movement of the tractor and/or trailer.

Figure 12:
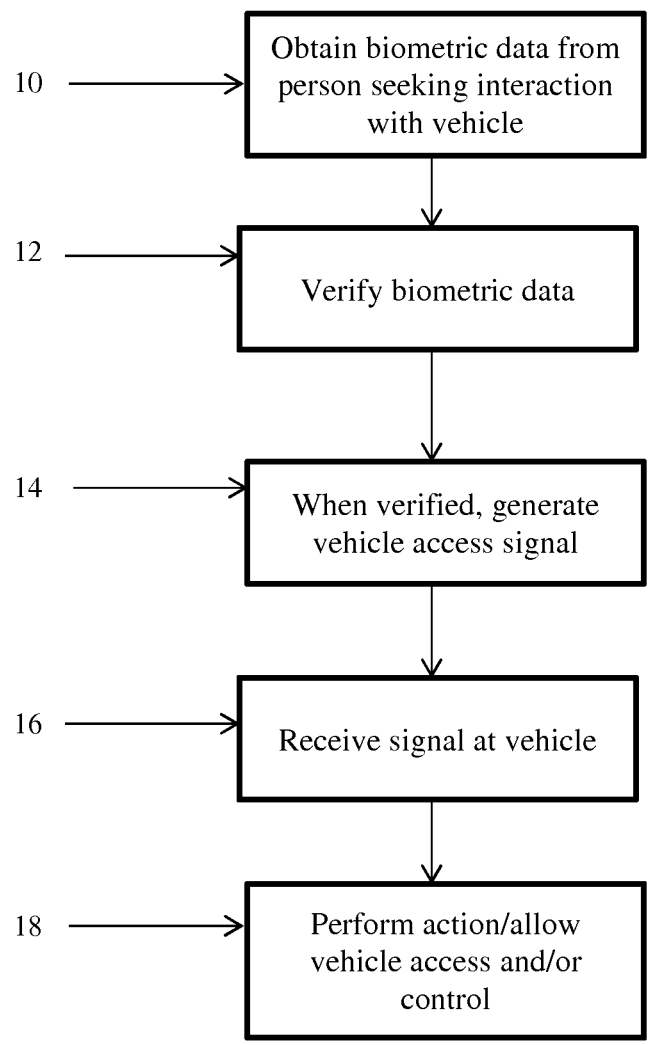
FIG. 12 is a flow chart showing a vehicle biometric-based interaction technique in accordance with the invention.

FIG. 12 shows a flowchart of the manner in which such a biometric identification system would operate in order to enable a driver, or other authorized personnel, to interact with the vehicle. In step 10, biometric data from the person seeking interaction with vehicle is obtained, e.g., from the driver by use of the driver's smartphone or other portable communications device. The biometric data is verified in step 12, e.g., by comparison to previously obtained and confirmed biometric data of the person. This comparison step may be performed at the person's device, at a processor on the vehicle or at a remote location. In step 14, when the biometric data is verified, a vehicle access signal is generated. This may entail the remote location generating and sending the vehicle access signal, the person's device generating and sending the vehicle access signal or the remote location directing the person's device to generate and send an appropriate vehicle access signal. If the biometric data is not verified, no vehicle access signal is sent and the vehicle remains inaccessible to the person. In step 16, the signal is received by a process on the vehicle that manages interaction with the vehicle. The action is performed or vehicle access and/or control is enabled in step 18. which may encompass managing access to the vehicle by controlling locking and unlocking and opening and closing of doors of the vehicle, managing operation of the vehicle by enabling or disabling a brake lockout device, managing operation of the vehicle by enabling or disabling an ignition shutoff device, and other vehicle interactions.

The smartphone should be proximate the vehicle to enable the biometric data to cause generation of a vehicle access signal. Thus, the driver should be within a set distance from the vehicle to ensure that it is the driver that is seeking access to the vehicle. This distance may be determined based on factors known to those in the cargo and vehicle security fields.

The vehicle may include a sensor within or associated therewith and the signal is a driver return message. In this case, the interaction with the vehicle includes sensing an identifiable biometric signature by the sensor. A processor on the vehicle may be configured to control interaction with the vehicle, and also include a recognition system that receives the entered biometric data and allows movement of the vehicle only when the entered biometric data matches expected biometric data. As mentioned elsewhere herein, the biometric data may be a fingerprint, a palm print, a hand print, a facial image, and/or a voiceprint, all of which may be obtained using the driver's smartphone. A combination of two or more of these biometric features may also be used in the invention.

Figure 2:
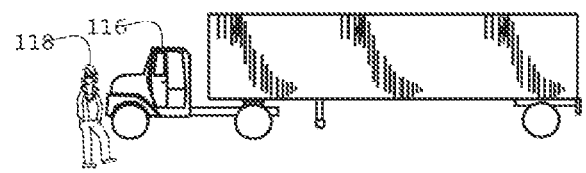
FIG. 2 illustrates the driver with the timed RFID 5 seconds after the tractor sensors have identified the driver, opened the door and disabled the security system.

As an alternative the driver can be provided with a keyless entry device, other RFID tag, smart card or cell phone with an RF transponder that can be powerless in the form of an RFID or similar device, which can also be boosted as described herein and above. Generally, such keyless entry devices can be considered a portable identification device. The interrogator, or a processing unit associated therewith, determines the proximity of the driver to the vehicle door. As shown in FIG. 1, if a driver 118 remains within a certain distance, 1 meter for example, from the door 116, for example, for a certain time period such as 5 seconds, then the door 116 can automatically unlock and ever open in some implementations. The distance and time period can be selected or determined as desired. Thus, as the driver 118 approaches the tractor and pauses, the door can automatically open (see FIG. 2).

An alternative system is for the smartphone owner to wear a watch or other item that can make a positive identification such as by a vein pattern and transmit this fact by Bluetooth to the smartphone, activating the smartphone which can then communicate with the vehicle.

Figure 3:
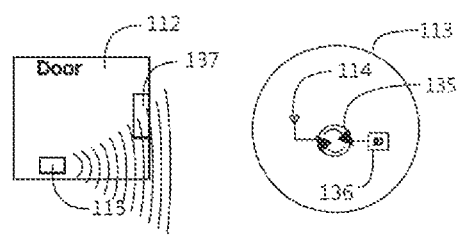
FIG. 3 illustrates a security disabling arrangement for a vehicle in accordance with the invention.

As shown in FIG. 3, an interrogator 115 is placed on the vehicle, e.g., in the door 112 as shown, and transmits coded waves. When the keyless entry device 113, which contains an antenna 114 and a circuit including a circulator 135 and a memory containing a unique ID code 136, is a set distance from the interrogator 115 for a certain duration of time, the interrogator 115 directs a door unlocking or opening device 137 to open or unlock the door 116. The duration of time is determined from the continuous reception by the interrogator 115 of the ID code 136 from the keyless entry device 113. The ID code can be a variable that is matched with the code expected by the interrogator or the code can be sent to the driver and a corresponding code, such as in the public key encryption system, sent to the interrogator from a remote site to prevent spoofing and opening of the door by an unauthorized person.

As discussed herein, information from a person entry detector can be sent by the communication network to notify interested parties of current status. Additionally, an audible alarm may be sounded and a photo can also be taken to identify the intruder or that there is an intruder. Also, motion sensors such as an accelerometer on a wall or floor of the vehicle or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell which may be connected to a pattern recognition system such as a neural network, for example, can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

The transmission of data such as obtained or derived from imagers, or other transducers, requiring on board processing of the information, using neural networks or other algorithms for example, to a remote location is an important feature of some of the inventions disclosed herein. This capability can permit an owner of a cargo container or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the driver, on the vehicle or an image or other biometric data of the driver can be sent to a remote location for recognition at that location.

If the driver is provided with an RFID with a biometric sensor, then systems can ascertain that the authorized driver is operating the rig and will not permit the rig to be operated otherwise. If the trailer transmits messages at periodic intervals and the remote site takes action if there is a skipped message or a message containing an error code and the error code verifies that the vehicle is on course and on schedule, then theft becomes very difficult. A theft is assumed if anything out of the ordinary occurs and the driver cannot provide an explanation. Congestion and weather delays can be independently verified.

5. Surround Trailer Monitoring

Cameras are now quite inexpensive and thus can be part of a comprehensive theft prevention system both internal and external to a trailer. Internally they can detect the opening of a door or other aperture into the trailer and can sound an alarm if the interior space of the trailer is breached. As mentioned elsewhere, this alarm can be in the form of a change in the message that is periodically transmitted to the remote monitoring site as well as an audio or visible alarm or a transmission to a device such as a cellphone carried by the driver. If, for example, the breaching of trailer security is done without causing a change in lighting within the trailer, then another event such as vibration or suspicious sound can trigger the acquiring of an image using an LED for lighting. Additionally this can be done automatically and periodically with the period being a function of the transmission frequency. When a new image is acquired it can be compared with a previous image and if any changes have occurred in the presence or positioning of the cargo, for example, then the message sent to the remote monitoring site can be appropriately altered to indicate the discovered change.

The first thing that a sophisticated thief will do is disable the off-site transmission system and so it is unlikely that a meaningful message will get transmitted, but the mere fact that no message is received may be information enough for the remote site to take action.

One or more 360 degree fisheye or any other field of view cameras can also be appropriately placed on the exterior of the trailer and images from the space around the trailer can be analyzed to see if anything of a worrisome nature is occurring. Such an event could be the approach of another trailer toward the rear of the subject trailer indicating that a transfer of cargo may be about to occur. Such an event could happen prior to the disarming or defeating of the transmission system to the remote site and thus could give advanced warning that a theft may be attempted. Any change in the environment around the trailer that may be indicative of an attempt to steal the trailer or the contents thereof can thus be signaled to the remote monitoring site. FIG. 6 illustrates one possible configuration of externally mounted cameras. Cameras 701 and 704 are shown facing with a field of view out from the side of the trailer. Camera 702 is illustrated as a camera having a 360 degree view around the trailer and camera 703 looks back from the rear of the trailer to view approaching offending trailers for possibly accepting stolen cargo.

6. System

Figure 4:
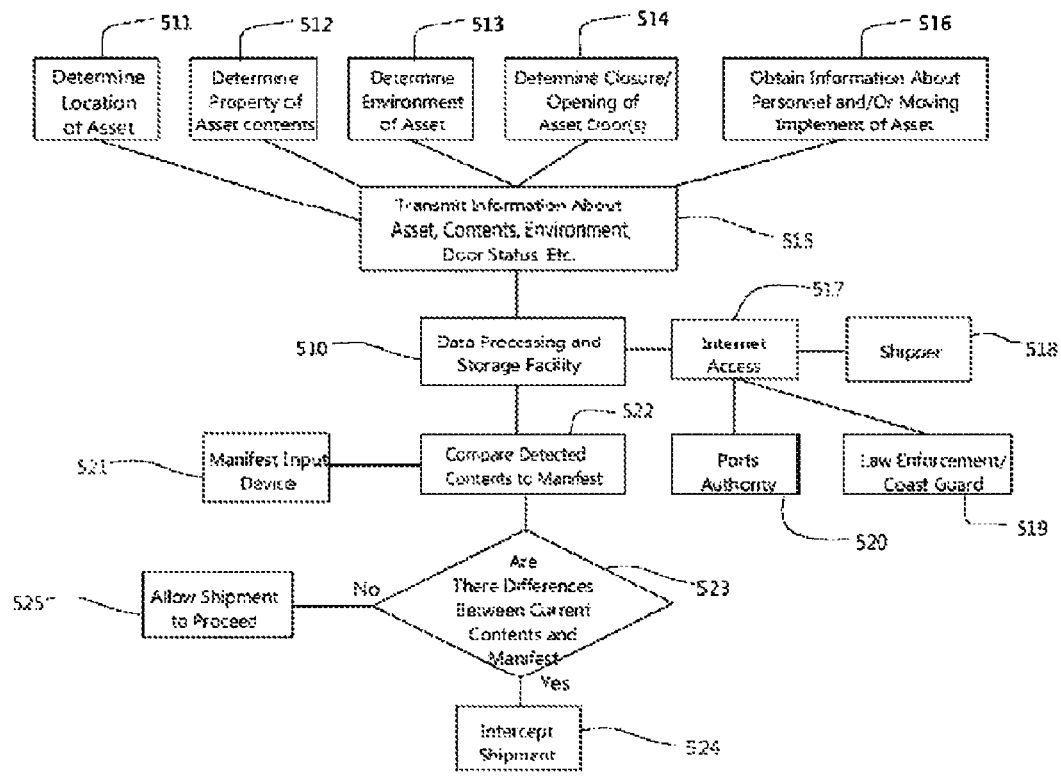
FIG. 4 is a flow chart showing one manner in which multiple assets are monitored in accordance with the invention.

FIG. 4 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516 or this information can be already stored from a communication setting up the shipping event from the shipping company. This latter information could also be entered by an input device attached to the asset.

The data processing and storage facility 510 is connected to the Internet at 517, in this preferred implementation, to enable shippers 518 to check the location and progress of the asset, the contents of the asset, the environment of the asset, whether the doors are being opened and closed impermissibly and the individual and companies handling the asset on an exception basis. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525. Of course if the SMS monitoring system has been implemented as discussed above the theft of any cargo will have been discovered within seconds of or even prior to its occurrence.

Having the ability to transmit coded information to a satellite, ubiquitous internet, SMS, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical, temperature, moisture etc. sensors among others.

Cameras either with or without a source of illumination can be used to record people approaching the container and perhaps stealing the contents of the container. These cameras can be at the parking locations at truck stops or on the trailers. A particularly appropriate camera is one that is positioned on top of the trailer and has a 360 degree field of view. See, for example, Ridden, P "Researchers develop genuine 3D camera", at the Gizmag.com website. At the appropriate frequencies, (terahertz, for example) the presence of concealed weapons can be ascertained as described in Alien Vision: Exploring the Electromagnetic Spectrum With Imaging Technology (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked almost as secure as a safe, for example, and only permit an authorized person carrying the proper identification to open the container or other storage facility.

A pattern recognition system can be trained to identify voice, palm, vein, butt, facial or iris patterns, for example, of authorized personnel or ascertain the identity of authorized personnel to prevent theft of the container. Such a pattern recognition system can operate on the images obtained by the cameras or other sensors which may, for example, be worn by the driver. That is, if the pattern recognition system is a neural network, it would be trained to identify or ascertain the identity of authorized personnel based on images or other data of such personnel during a training phase and thus operationally only allow such personnel to open the container, enter the container and/or handle the container.

A wide variety of smart cards, biometric identification systems (such as fingerprints, voice prints, palm prints, vein prints and Iris scans) can be used for the same purpose. When an unauthorized person approaches the container, his or her picture can be taken and, in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors, or information based on this output, can now be transmitted to a remote facility using a variety of telematics methods including communication via a low power link to the internet, SMS or a satellite, such as provided by the Skybitz Corporation as described above and others.

Thus, as mentioned above, many new opportunities now exist for applying a wide variety of sensors to a cargo container or other object as discussed above and below. Through a communication system such as a ubiquitous internet, a cell phone network using SMS, a LEO or geostationary or other satellite system, critical information about the environment of container or changes in that environment can be transmitted to the container owner, law enforcement authorities, container contents owner etc. Furthermore, the system is generally low cost and may not require connection to an external source of power. The system generally uses low power from a battery that can last for years without maintenance depending on the duty cycle. In the case of such a battery, the charge state can also be communicated permitting timely replacement or recharging.

Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents as discussed above. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the communication channel that an exception situation exists and to prepare to receive additional information.

Many of the sensors on the container and inside the container may also require significant energy and thus should be used sparingly. For example, if the container is known to be empty and the doors closed, there may be no need to monitor the interior of the container unless the doors have been reopened. Similarly, if the container is stationary in a secured location and doors are closed, then continuously monitoring the interior of the container to determine the presence of cargo is unnecessary. Thus, each of the sensors can have a program duty cycle that depends on exterior or other events. In some applications either energy harvesting such as solar power or other source of power may be available either intermittently to charge the battery or continuously.

If the vehicle such as a container is stationary at a secured location, then usually the monitoring can take place infrequently and the battery is conserved. When the vehicle is in motion, then energy is frequently available to charge the battery and thus more frequent monitoring can take place as the battery is charged. Finally if the container is stationary but not at a secured location, then very frequent monitoring may be called for, The technique is known as "energy harvesting" and involves, for example, the use of a piezoelectric material that is compressed, bent or otherwise flexed thereby creating an electric current that can be used with appropriate circuitry to charge the battery. Other methods include the use of a magnet and coil where the magnet moves relative to the coil under forces caused by the motion of the vehicle or an air turbine powered by the flow of air surrounding a moving vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. For some applications, in order to minimize the power expended at the sensor installation, the IMU correction calculations based on the GPS can be done at an off sensor location such as the receiving station of the communicated information. The IMU or other inertial sensors can also be used to characterize the roadway on which the trailer is traveling perhaps giving an early warning if the trailer has left the expected roadway and is traveling on an unexpected secondary road indicative of the theft of the trailer or of the tractor and trailer combination. Of course if the route has been programmed into the onboard processor, then deviation from the route would be known and the appropriate error code transmitted.

If the vehicle operates on a road that has previously been accurately mapped, to an accuracy of perhaps a few centimeters, then the analysis system can know the input from the road to the vehicle tires and thus to the chassis of the trailer. From this the system could know if the mass of the container has changed. The IMU can also calculate the velocity of the trailer. By monitoring the motion of the container when subjected to a known stimulus, the road, the inertial properties of the container and chassis system can be estimated. If these inertial properties are known, then a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system via telematics when the road is covered with ice or when it encounters a pothole. In some cases a thief can cause a tire to fail and thus cause the driver to pull off the road to investigate giving the thief the opportunity to commandeer the vehicle. Such a tire failure event can alert the remote site and the transmission rate can be increased.

Thus, there are many safety related aspects to having sensors mounted on a container and where those sensors can communicate periodically with a LEO or other satellite, the internet, SMS, or other communication system, and thereafter to the Internet or directly to the appropriate facility. Some of these rely on an accurate IMU. Although low cost IMUs are generally not very accurate, when they are combined using a Kalman filter, neural network or other algorithm with the GPS system, which is on the container as part of the tracking system, the accuracy of the IMU can be greatly improved, approaching that of military grade systems.

The discussion above has concentrated, in part, on containers that contain cargo where presumably this cargo is shipped from one company or organization to another. This cargo could be automotive parts, animals, furniture, weapons, bulk commodities, machinery, fruits, pharmaceuticals, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a ubiquitous internet or cell phone network, SMS, or a satellite system exists such as the Skybitz, for example, LEO or geostationary satellite system coupled with a low cost low power small GPS receiver and communication device capable of sending information periodically to the internet, cell phone network or satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination with the latest GPS category III satellites is currently on the order of a few meters and soon will be on the order of decimeters. However, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via the aforementioned communication system can also know the DGPS corrections at the asset location and thus can relay to the vehicle its precise location.

Many transmission modes exist including cellular phone systems, satellite communications and the Internet. The Internet systems can be broken into two types, those in use now that are available only at particular "hot-spots" and a ubiquitous internet which by definition is available almost everywhere. The use of ubiquitous internet is believed to be unique to the inventions herein as the inventors may have been the first to recognize that ubiquitous internet would become available at least partially due to the inventions herein and can be counted on to provide the sole system for communication from various vehicles including automobiles, trucks and truck trailers, storage tanks and shipping containers replacing all other communication systems. Their vision is now being realized through such systems as Super WiFi, WiMAX and LTE.

7. Continuous Improvement, Upgradable Software

A related technology that can be integrated into a cargo theft prevention system includes the use of the driver's cell phone signal to locate the driver and determine whether he or she is inside the tractor. If the position of the trailer is known from a trailer resident system and that shows that the trailer is moving away from the driver's cell phone, then even if all else appears in order there is cause for alarm. In another case the SMS from the driver's cellphone or from a trailer or tractor resident system can be used to automatically unlock and open a yard gate or warehouse door eliminating time lost in waiting for such an event and permitting the tractor to quickly move into a secure location. A truck which needs to wait for the gate to be opened, for example, may be a target for a thief or hijacker.

A smartphone can be used to operate various components within the vehicle which are not necessarily related to preventing thefts but may facilitate the safe passage of the vehicle to its final destination. If the vehicle has a heads-up display on the windshield, for example, messages from the home office can be displayed to warn the driver of bad weather, an accident etc.

Vehicle resident sensors can be used to monitor the environment both inside and outside of the tractor and trailer and can send messages as part of the SMS message when, for example, a criminal introduces a gas into the tractor compartment to immobilize the operator. While monitoring the temperature within the trailer or in the environment, presence of smoke in the exterior environment etc. can be send with each SMS message or on an exception basis.

Additionally, vehicle or driver resident sensors can monitor the health of the driver to determine if he has had or is about to have a heart attack, has had too much to drink or is operating under the influence of drugs or is just getting drowsy or maybe even killed or rendered unconscious by a thief. The vapors within the tractor as well as the driver's heartbeat and breathing rate can be monitored with vehicle resident sensors as discussed in U.S. patent application Ser. No. 13/419,988 filed Mar. 14, 2012. Messages related to the sensor determinations can be appended to the periodic SMS messages and can influence the rate that these messages are transmitted.

The SMS messages sent by the vehicle can also be used to pay tolls eliminating the need for the tractor to carry multiple RFID transponders such as an EZ-Pass and a Sunpass, for example. Through setting up a cooperative agreement on a state by state basis the tolling authority can get a message from the remote site that a vehicle is about to enter the Lincoln Tunnel, for example, and that the toll is being paid by XYZ company rather than by an EZ-pass transponder. This then begins the process of eventually providing for tolls based on miles traveled rather than on fuel taxes and toll stations.

Some of the products that arise from the inventions disclosed herein include brake locking systems, SMS communication systems, Intrusion monitors, the use of drones to locate stolen trailers and location systems for stolen trailers.

The development of theft prevention systems must continue to evolve as the thieves become more sophisticated. Since the goal is zero thefts, every time a theft of an equipped trailer occurs the system will need revision to remove the newly discovered failure mode. This may require that software resident on trailer theft prevention systems be upgradeable remotely.

Basically the system described herein can be implemented in stages as the thieves become more sophisticated. This system if implemented now would probably eliminate 90% to 99% of cargo theft. Since the driver presence can become a key element in a successful theft, the incidence of hijacking the driver alone with the rig will probably increase even though the penalty of the crime also significantly increases. For example, assume that the thief places an explosive device on the driver's door when the driver stops for a traffic light and calls the driver on his cell phone to give him instructions. The first instruction may be to open the window so that a radio communication device can be placed within the cab. The driver is then instructed to drive to a particular location where the theft quickly occurs. This type of event has yet to occur and that gives time for its preparation.

The theft of cargo in transit has mainly been considered above. A significant percentage of cargo thefts occur at terminals and principles similar those discussed above can be applied to solving this problem. If the cargo has already been placed within a trailer, then the principles above should eliminate the problem. Basically the setting of the trailer brakes prevents movement of trailer. Authorized driver (AD) parks trailer, the brakes engage and disengage when AD returns. AD is determined by remote site that pairs trailer ID with AD to allow movement. The trailer when loaded sends messages frequently as discussed above. Lack of an expected received message creates an alarm.

Cargo theft within a warehouse is the responsibility of the warehouse management. If the driver is part of the theft gang, then that should be obvious as the theft is occurring. Counterfeit shipping documents can be determined by the use of driver biometric IDs. If the driver drops off the container at an unauthorized site, the status transmissions will stop or not be as anticipated resulting in an alarm. The grab and run case where an individual or group follows a targeted truck in a van and when the truck comes to a stop, suspects exit the van, open trailer doors and off-load cargo before the truck takes off would cause an error code or the status transmissions to stop. In either case the theft has been detected early and by making it difficult to open the doors the theft can be delayed long enough for the authorities to spring into action. Also by putting transmitters within the cargo and further securing the cargo to the trailer this can significantly delay the theft and permit the stolen cargo to be tracked.

Some other types of events that may need to be addressed if they become common include, as reported in the aforementioned 2007 EU Parliament report, the Transported Asset Protection Association (TAPA):

1. The use of Gas or explosives. Gas will allegedly be piped through the air vents into the driver's cabin or explosives may be used as a diversion. Gas related incidents have been reported across Europe, in Spain, the UK, France, Italy and Belgium, while in Sweden armed gangs have been using explosives.
2. Impersonation of police/customs officers. Criminals dressed as police or customs officers will signal to the driver that he must pull over, at which point they will take control of the vehicle, often using violence to do so. The uniforms worn by the criminals are often genuine. The sophistication of disguises has increased with criminals now seemingly aware that they can no longer rely on simple flashing blue lights to stop vehicles. Drivers are reminded that normally they will only be asked to stop by uniformed officers in marked vehicles and, when in doubt, to use their vulnerable load cards.
3. Staged accident. Criminals will stage an accident so that the driver will have to stop. They will then take the vehicle from him by force. This technique has been used in a number of different crimes and not exclusively in the UK. The technique is risky but one of the best ways to bypass security measures such as off route alarms and panic buttons. Security managers should review reporting procedures for drivers.
4. Forced stop. Criminals may set up a fake checkpoint on the road so that the driver will have to stop. Again, the vehicle will be taken by force.
5. Moving vehicle attack. Offenders approach moving load from behind, jumping from their own vehicle onto the loaded truck and remove goods from the still driving vehicle, often by simply throwing them off the trailer.
6. Target vehicle marking Offenders approach targeted vehicles and either mark them so they are easier to follow from distance: placing of reflective items at the rear or breaking light fittings to show a white light at the rear.
7. Theft of load or loaded vehicles from compound. Offenders approach and remove either loads or entire loaded vehicles and drive away often utilizing information from current of previous legitimate employees. Vulnerable load cards were introduced by the transport industry of some EU Member States. The card explains (for example to police) that the driver is all right with any police controls though not in dark and remote places. It suggests that the driver follows the patrol car to the nearest police station or similar before the control is done. However, most EU police forces do not acknowledge this card officially.
8. Tracking devices. GPS systems allow truck movements to be monitored either during routine delivery or when notified that it is subject to a crime. Most GPS systems operate by line of sight, meaning their antenna has to see the sky in order to send tracking information. What professional cargo thieves will do is disconnect a GPS antenna the moment they steal a truck, thereby thwarting the system. In response, GPS manufacturers have tried to overcome this by concealing their antennas. Cellular assisted GPS units don't require line of sight to a satellite, have no visible antennas and can be put in trailers or mixed with a truck's cargo in order to prevent it from being found. Systems should be developed to escalate any activation to the police/law enforcement agencies. Companies managing these systems should be certified by the relevant national authorities.

Most of the above events are handled by the combination of the inventions listed above including brake locking, messaging, driver biometric based IDs, route deviation sensing etc.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

Finally, all of the patents, patent application publications, non-patent literature and any other documents mentioned above are incorporated by reference herein.

The invention claimed is:

1. A method for interacting with a vehicle from which status messages are sent at a first rate from the vehicle using a communications system or whose use is monitored at a first, set frequency by a monitoring system, comprising:

receiving biometric data from a biometric sensor of a portable communications device proximate the vehicle, the portable communications device being configured to use a communications network for voice and data communications between the portable communications device and other remotely situated communications devices;

causing a vehicle control signal to be generated when the biometric data received at the portable communications device is from a person authorized to interact with the vehicle;

causing the generated vehicle control signal to be provided to a signal-receiving component on the vehicle such that interaction with the vehicle is controlled based on the received biometric data; and changing the rate at which the messages are sent from the vehicle using the communications system from the first rate to a second, different rate dependent on analysis of the received biometric data relative to known biometric data or the frequency at which use of the vehicle is monitored by the monitoring system from the first frequency to a second, different frequency dependent on analysis of the received biometric data relative to known biometric data such that different received biometric data causes different changes in the rate at which messages are sent or different frequencies at which use of the vehicle is monitored.

2. The method of claim 1, further comprising verifying the received biometric data as known biometric data of a driver of the vehicle prior to generating the vehicle control signal.

3. A method for interacting with a vehicle from which status messages are sent at a first rate from the vehicle using a communications system or whose use is monitored at a first, set frequency by a monitoring system, comprising receiving, at a signal-receiving component on the vehicle, a vehicle control signal and biometric data generated from a biometric sensor of a portable communications device proximate the vehicle, the portable communications device being configured to use a communications network for voice and data communications between the portable communications device and other remotely situated communications devices;

determining, using a processor on the vehicle, whether the biometric data received by the signal-receiving component is from a person authorized to interact with the vehicle;

only if so, performing vehicle action based on the vehicle control signal received by the signal-receiving component; and changing a rate at which the messages are sent from the vehicle using the communications system from the first rate to a second, different rate dependent on analysis of the biometric data received by the signal-receiving component relative to known biometric data or the frequency at which use of the vehicle is monitored by the monitoring system from the first frequency to a second, different frequency dependent on analysis of the biometric data received by the signal-receiving component relative to known biometric data such that different biometric data received by the signal-receiving component causes different changes in the rate at which messages are sent or different frequencies at which use of the vehicle is monitored.

4. The method of claim 1, wherein the biometric sensor is configured to obtain a fingerprint.

5. The method of claim 1, wherein the biometric sensor is configured to obtain a palm print.

6. The method of claim 1, wherein the biometric sensor is configured to obtain a hand print.

7. The method of claim 1, wherein the biometric sensor is configured to obtain a facial image.

8. The method of claim 1, wherein the biometric sensor is configured to obtain a voiceprint.

9. The method of claim 1, wherein the step of causing a vehicle control signal to be generated when the biometric data received at the portable communications device is from a person authorized to interact with the vehicle comprises:

transmitting the received biometric data to a remote site separate and apart from the vehicle at which the known biometric data is accessible; and performing biometric data verification of the received biometric data at the remote site by analyzing the received biometric data relative to the known biometric data, the vehicle control signal based on the biometric data received at the portable communications device proximate the vehicle being generated at the remote site, and the step of causing the generated vehicle control signal to be provided to a signal-receiving component on the vehicle comprises transmitting the vehicle control signal from the remote site to the signal-receiving component on the vehicle.

10. The method of claim 3, wherein the step of performing vehicle action based on the vehicle control signal received by the signal-receiving component comprises maintaining a brake lockout mechanism coupled to at least one brake of the vehicle in a locked state until the vehicle control signal is received.

11. The method of claim 3, wherein the step of performing vehicle action based on the vehicle control signal received by the signal-receiving component comprises maintaining at least one door of the vehicle in a locked state until the signal is received.

12. A method for preventing theft of cargo from a vehicle transporting the cargo and from which status messages are sent at a first rate from the vehicle using a communications system or whose use is monitored at a first, set frequency by a monitoring system, comprising:

receiving biometric data from a biometric sensor of a portable communications device proximate the vehicle, the portable communications device being configured to use a communications network for voice and data communications between the portable communications device and other remotely situated communications devices;

causing a signal to be generated when the biometric data received at the portable communications device is from a person authorized to access, handle or move the cargo;

causing the generated signal to be provided to a cargo-control component on the vehicle such that access to, handling of or movement of the cargo is conditioned on receipt of the signal and thus the received biometric data; and changing a rate at which the messages are sent from the vehicle using the communications system from the first rate to a second, different rate dependent on analysis of the biometric data received at the portable communications device relative to known biometric data or the frequency at which use of the vehicle is monitored by the monitoring system from the first frequency to a second, different frequency dependent on analysis of the biometric data received at the portable communications device relative to known biometric data such that different biometric data received by at the portable communications device causes different changes in the rate at which messages are sent or different frequencies at which use of the vehicle is monitored.

13. The method of claim 12, wherein the step of causing a signal to be generated when the biometric data received at the portable communications device is from a person authorized to access, handle or move the cargo comprises verifying the entered biometric data as known biometric data of a driver or other authorized operator of the vehicle or handler of the cargo of the vehicle prior to generating the signal to enable access to, handling of or movement of the cargo.

14. The method of claim 12, wherein the step of causing a signal to be generated when the biometric data received at the portable communications device is from a person authorized to access, handle or move the cargo comprises generating the signal using a processor on the vehicle that performs the biometric data verification and provides the generated signal to the cargo-control component on the vehicle.

15. The method of claim 12, wherein the step of causing a signal to be generated when the biometric data received at the portable communications device is from a person authorized to access, handle or move the cargo comprises:
   transmitting the received biometric data to a remote site separate and apart from the vehicle at which the known biometric data is accessible; and
   performing biometric data verification of the received biometric data at the remote site by analyzing the received biometric data relative to the known biometric data, the signal based on the biometric data received at the portable communications device proximate the vehicle being generated at the remote site, and
   the step of causing the generated signal to be provided to a cargo-control component on the vehicle comprises transmitting the signal from the remote site to the cargo-control component on the vehicle.

16. The method of claim 1, wherein the generated vehicle control signal is generated to cause a brake lockout mechanism coupled to at least one brake of the vehicle to be maintained in a locked state until the vehicle control signal is received.

17. The method of claim 1, wherein the generated vehicle control signal is generated to cause a doors of the vehicle to be maintained in a locked state until the vehicle control signal is received.

18. The method of claim 1, wherein the communications device is a smartphone.

19. The method of claim 3, wherein the communications device is a smartphone.

20. The method of claim 12, wherein the communications device is a smartphone.

21. The method of claim 1, wherein the analysis of the received biometric data relative to known biometric data includes a comparison of the received biometric data to the biometric data of a driver of the vehicle,
   the step of changing the rate at which the messages are sent from the vehicle using the communications system dependent on analysis of the received biometric data or the frequency at which use of the vehicle is monitored by the monitoring system dependent on analysis of the received biometric data comprising reducing the rate at which the messages are sent from the vehicle or reducing the frequency at which use of the vehicle is monitored by the monitoring system when the analysis of the received biometric data indicates that the received biometric data corresponds to the known biometric data of the driver of the vehicle.

22. The method of claim 1, wherein the step of changing the rate at which the messages are sent from the vehicle using the communications system dependent on analysis of the received biometric data relative to known biometric data or the frequency at which use of the vehicle is monitored by the monitoring system frequency dependent on analysis of the received biometric data relative to known biometric data comprises directing the communications system to change the rate at which the messages are sent from the vehicle dependent on analysis of the received biometric data relative to known biometric data.

23. The method of claim 1, wherein the step of changing the rate at which the messages are sent from the vehicle using the communications system dependent on analysis of the received biometric data relative to known biometric data or the frequency at which use of the vehicle is monitored by the monitoring system frequency dependent on analysis of the received biometric data relative to known biometric data comprises directing the monitoring system to change the frequency at which use of the vehicle is monitored dependent on analysis of the received biometric data relative to known biometric data.

24. The method of claim 3, wherein the step of determining, using a processor on the vehicle, whether the biometric data received by the signal-receiving component is from a person authorized to interact with the vehicle comprises comparing the biometric data received by the signal-receiving component to known biometric data of the person authorized to interact with the vehicle,
   the step of changing the rate at which the messages are sent from the vehicle using the communications system dependent on analysis of the biometric data received by the signal-receiving component relative to known biometric data or the frequency at which use of the vehicle is monitored by the monitoring system dependent on analysis of the biometric data received by the signal-receiving component relative to known biometric data comprising reducing the rate at which the messages are sent from the vehicle using the communications system or reducing the frequency at which use of the vehicle is monitored when the analysis of the biometric data received by the signal-receiving component relative to known biometric data indicates that the biometric data corresponds to the known biometric data of the person authorized to interact with the vehicle.

25. The method of claim 3, wherein the step of changing the rate at which the messages are sent from the vehicle using the communications system dependent on analysis of the biometric data received by the signal-receiving component relative to known biometric data or the frequency at which use of the vehicle is monitored by the monitoring system dependent on analysis of the biometric data received by the signal-receiving component relative to known biometric data comprises directing the communications system to change the rate at which the messages are sent from the vehicle dependent on analysis of the biometric data received by the signal-receiving component relative to known biometric data.

26. The method of claim 3, wherein the step of changing the rate at which the messages are sent from the vehicle using the communications system dependent on analysis of the biometric data received by the signal-receiving component relative to known biometric data or the frequency at which use of the vehicle is monitored by the monitoring system dependent on analysis of the biometric data received by the signal-receiving component relative to known biometric data comprises directing the monitoring system to change the frequency at which use of the vehicle is monitored dependent on analysis of the biometric data received by the signal-receiving component relative to known biometric data.

27. The method of claim 12, wherein the analysis of the received biometric data relative to known biometric data includes a comparison of the received biometric data to the biometric data of a driver of the vehicle,
   the step of changing a rate at which the messages are sent from the vehicle using the communications system dependent on analysis of the biometric data received at the portable communications device relative to known biometric data or the frequency at which use of the vehicle is monitored by the monitoring system dependent on analysis of the biometric data received at the portable communications device relative to known biometric data comprising reducing the rate at which the messages are sent from the vehicle or reducing the frequency at which use of the vehicle is monitored by the monitoring system when the analysis of the received biometric data indicates that the received biometric data corresponds to the known biometric data of the driver of the vehicle.

28. The method of claim 12, wherein the step of changing the rate at which the messages are sent from the vehicle using the communications system from the first rate to a second, different rate dependent on analysis of the biometric data received at the portable communications device relative to known biometric data or the frequency at which use of the vehicle is monitored by the monitoring system from the first frequency to a second, different frequency dependent on analysis of the biometric data received at the portable communications device relative to known biometric data comprises directing the communications system to change the rate at which the messages are sent from the vehicle dependent on analysis of the biometric data received at the portable communications device relative to known biometric data.

29. The method of claim 12, wherein the step of changing the rate at which the messages are sent from the vehicle using the communications system from the first rate to a second, different rate dependent on analysis of the biometric data received at the portable communications device relative to known biometric data or the frequency at which use of the vehicle is monitored by the monitoring system from the first frequency to a second, different frequency dependent on analysis of the biometric data received at the portable communications device relative to known biometric data comprises directing the monitoring system to change the frequency at which use of the vehicle is monitored dependent on analysis of the biometric data received at the portable communications device relative to known biometric data.

* * * * *